(12) United States Patent
Gebhart et al.

(10) Patent No.: US 8,479,209 B2
(45) Date of Patent: Jul. 2, 2013

(54) AUTOMATED EXECUTION OF VIRTUAL APPLIANCES

(75) Inventors: Alexander Gebhart, Ubstadt-Weiher (DE); Erol Bozak, St. Leon-Rot (DE)

(73) Assignee: SAP AG, Walldorf (DE)

( * ) Notice: Subject to any disclaimer, the term of this patent is extended or adjusted under 35 U.S.C. 154(b) by 1251 days.

(21) Appl. No.: 12/038,780

(22) Filed: Feb. 27, 2008

(65) Prior Publication Data
US 2009/0216999 A1   Aug. 27, 2009

(51) Int. Cl.
*G06F 9/46* (2006.01)
(52) U.S. Cl.
USPC .......................... 718/104; 718/103
(58) Field of Classification Search
None
See application file for complete search history.

(56) References Cited

U.S. PATENT DOCUMENTS

2006/0005181 A1* 1/2006 Fellenstein et al. ........... 717/174
2009/0300605 A1* 12/2009 Edwards et al. .................. 718/1

* cited by examiner

*Primary Examiner* — Emerson Puente
*Assistant Examiner* — Sisley Kim
(74) *Attorney, Agent, or Firm* — Mintz Levin Cohn Ferris Glovsky and Popeo, P.C.

(57) ABSTRACT

Methods and apparatus, including computer program products, are provided for selecting a processor, such as a hardware provider, for executing a virtual appliance. In one aspect, there is provided a computer-implemented method. The method may include receiving information representative of whether one or more processors are capable of executing at least one of a plurality of virtual appliances. The received information may further including one or more costs to execute the at least one virtual appliance at one of the processors. One of the processors may be selected based on the received information. The selection enables the processor to execute the at least one virtual appliance. Related apparatus, systems, methods, and articles are also described.

12 Claims, 4 Drawing Sheets

AUTOMATED EXECUTION OF VIRTUAL APPLIANCES

FIELD

The present disclosure generally relates to virtualization technology. More particularly, the present disclosure relates to a process for executing virtual appliances.

BACKGROUND

Computers have now become an integral part of our society both in business and in residential settings. Almost every business of sufficient size in Germany, the United States, and other developed countries has one or more computers to assist them in running their businesses. Similarly, many families in those countries now have computers at home that are used to run various applications including games.

Some attribute the popularity of computers to the Internet. The Internet provides people with ready access to vast amounts of data. Many people now get their news, sports, stock, entertainment, and other information primarily from the Internet. Businesses have also embraced the Internet. The Internet provides the opportunity for computers to communicate instantly with other computers or individuals. Business processes that were once restricted to intranets and their users are now moving to the Internet. Accordingly, companies are moving more and more of their data to electronic forms. In addition, companies have amassed huge amounts of data in an effort to understand their business, improve performance, and build stronger employee, customer, and partner relationships.

Virtualization technology provides a mechanism for optimizing processing at a computer. Virtualization technology provides a software layer that when executed allows multiple virtual machines with, in some cases, different operating systems to run side-by-side with other virtual machines running on the same physical machine (e.g., a node, a computer, a processor, a server, a blade, and the like). The virtualization software provides a so-called "wrapper" that wraps and isolates the virtual machine from other virtual machines. For example, in a server complex including fifty physical servers, each of which hosts its own application server, virtualization permits the server complex to instead operate with, for example, twenty-five physical servers, each of which includes virtualization software providing two virtual machines for the application servers. In both cases, fifty application servers are deployed, but with virtualization, the number of physical servers is reduced to twenty-five. Virtualization software may provide one or more of the following functions: running multiple virtual machines with different operating systems at the same time on the same physical machine; generating fully configured isolated virtual machines with a set of virtual hardware including an operating system and applications; saving, copying, and provisioning of virtual machines; and moving virtual machines from one physical machine to another physical machine for workload management.

When a virtual machine is used, the virtual machine may include an operating system. The operating system may include one or more programs, such as applications. An operating system (OS) is the program that, after being initially loaded into the computer by a boot program, manages other programs on the computer. The other programs (also referred to herein as application programs or applications) may use the operating system by making requests for services through one or more application program interfaces (APIs) of the operating system. A program (or application) may perform one or more specific functions (or tasks) directly for a user or, in some cases, another program. A virtual machine may include an operating system, such as Linux or Windows Vista, and one or more applications, such as a browser, all of which operate in the so-called "wrapper" provided by the virtual machine.

In some cases, the virtual machine may also include some data for use by at least one of the operating system and the application. When this is the case, the virtual machine may be referred to as a "virtual appliance." The phrase "virtual appliance" refers to an example of a virtual machine that may include the application, operating system, and data (e.g., application data, configuration information, drivers, and the like) to enable simplification of the installation and the configuration process associated with running the application. An example of a virtual appliance is the MediaWiki software that powers Wikipedia, which is available as a virtual appliance. The MediaWiki appliance contains all the necessary software, including operating system, database, and MediaWiki, to run a wiki installation as a so-called "black box."

SUMMARY

The subject matter disclosed herein provides methods and apparatus, including computer program products, for executing virtual appliances.

In one aspect, there is provided a computer-implemented method. The method may include receiving information representative of whether one or more processors are capable of executing at least one of a plurality of virtual appliances. The received information may further includes one or more costs to execute the at least one virtual appliance at one of the processors. One of the processors may be selected based on the received information. The selection enables the processor to execute the at least one virtual appliance. Related apparatus, systems, methods, and articles are also described.

The subject matter described herein may be implemented to realize the advantage of simplifying the implementation of a virtual appliance at the physical machine best suited (e.g., in terms of capabilities and/or cost) to execute the virtual appliance.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

In the drawings.

Like labels are used to refer to same or similar items in the drawings.

DETAILED DESCRIPTION

Figure 1:
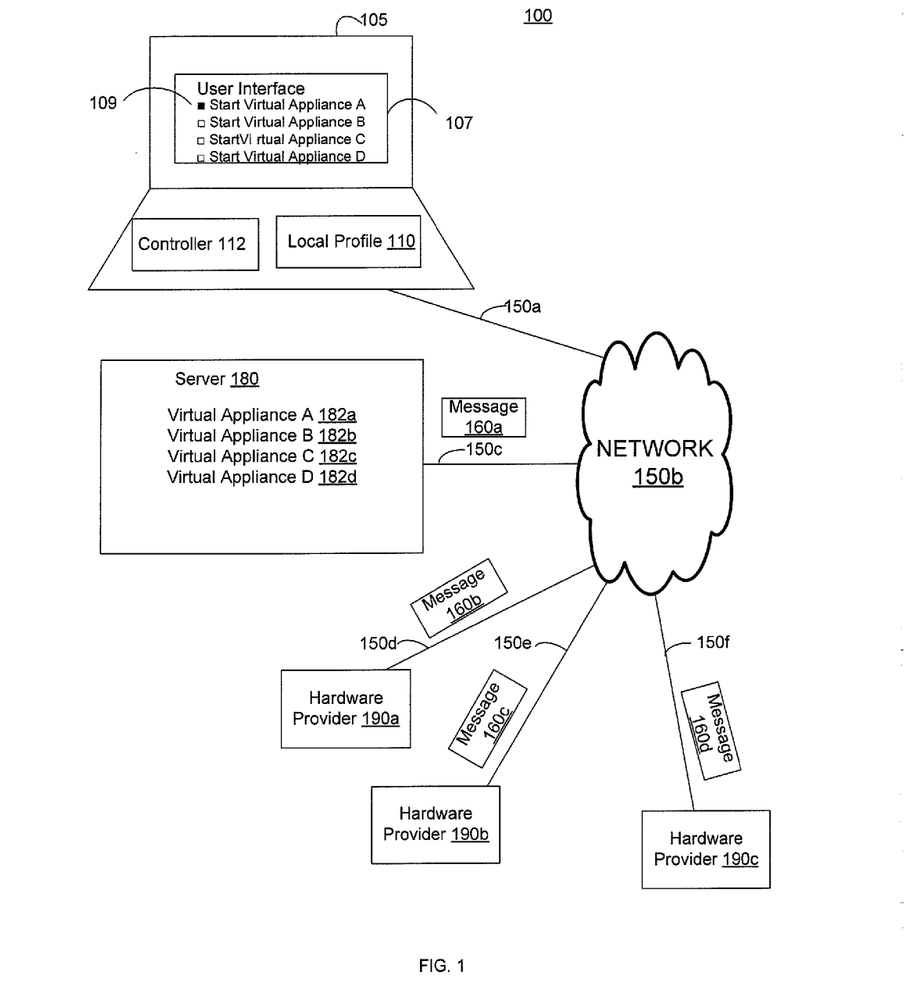
FIG. 1 depicts a block diagram of a system 100 for executing a virtual appliance at a hardware provider.

FIG. 1 depicts a system 100 including a computer 105, a server 180, and one or more hardware providers 190a-c, all of which are coupled by a network 150*a-f*. The computer 105 further includes a user interface 107, a controller 112, and a local profile 110.

User interface 107 may be implemented as any type of interface that enables interaction with aspects of system 100, including server 180, controller 112, and local profile 110. For example, the user interface 107 may be implemented as a browser (e.g., Netscape Navigator) or a client application to interface with (and/or access) server 180 to select one or more of the virtual appliances 182*a-d*.

Controller 112 may be used to control the process for executing virtual appliances. For example, controller 112 may be used to perform one or more of the following: configure local profile 110; select from among one or more virtual appliances at a server, such as a web site; provide to hardware providers information regarding the selected virtual appliance (e.g., message 160*a*); receive from hardware providers responses (e.g., messages 160*b-d*); select a hardware provider based on the received responses and/or other criteria; and determine which hardware provider is best suited (e.g., in terms of cost and/or capability) to execute the virtual appliance. Although controller 112 is depicted at computer 105, controller 112 may be located at other locations as well.

Local profile 110 may include information representative of one or more of the following: the location, such as Internet Protocol (IP) addresses, of one or more hardware providers; whether a search or a query of hardware providers may be performed to identify the hardware providers; and what type of hardware providers may be searched or queried (e.g., a search for hardware providers on an intranet, the Internet, or on a list, such as a list of trusted hardware providers). Although local profile 110 is depicted at computer 105, local profile 110 may be stored in any other location, such as a central location accessible via the Internet.

In some implementations, local profile 110 may be configured by user interface 107 (e.g., a user using user interface 107). For example, controller 112 may prompt a user to select or provide aspects of the above-described local profile 110 including one or more of the following: the location of one or more hardware providers; whether a search or a query of hardware providers may be performed; and what type of hardware providers may be searched or queried.

Server 180 may be implemented as web site or portal. For example, server 180 may be implemented as a web site including one or more virtual appliances 182*a-d*, each of which may be selected by user interface 107.

Hardware providers 190*a-c* may be implemented as a processor, such as a computer, a server, a blade or any other processor capable of executing (i.e., running) an application, such as a virtual appliance. Specifically, hardware providers 190*a-c* may be implemented as computers on an Internet, an intranet, and/or at an approved (or trusted) server facility. The hardware providers 190*a-c* may each have a variety of capabilities, such as processing speed, memory capacity, storage capacity, and network bandwidth, i.e., bandwidth to and from network 150*a-f*). Moreover, hardware providers 190*a-c* may have a variety of associated costs (e.g., in Dollars, Euros, Indian Rupee, time, and the like) to execute a virtual appliance. In some cases, a hardware provider may be located at a server facility that provides computing resources (e.g., processing capacity) for hire. In some implementations, hardware providers offer hardware to customers. The hardware, provided by the hardware provider, can be offered in different ways. For example, the hardware provider may offer hardware to customers as a physical machine with an operating system (OS). The virtual appliance runs on top of the actual operating system. In other cases, the hardware provider may offer hardware to customers as a physical machine running an operating system. The virtual machine runs on top of the OS, and the virtual appliance runs on top of a virtual operating system (a so-called "cloud computing" approach). In other cases, the hardware provider may offer hardware to customers as a physical machine with a hypervisor running directly on the physical machine (e.g., a VMware ESX). The virtual appliance runs on top of a hypervisor. In other cases, the hardware provider may offer hardware to customers with only the physical machine with little or nothing on it, i.e., the hardware provider offers a mechanism to put an image on the physical machine (e.g. via a blade management system). In this last case, the virtual appliance is an image. In the cases described above, local profile 110 and controller 112 ensure that the virtual appliance is able to run on the different hardware offerings.

In some implementations, controller 112 may send to each of the hardware providers 190*a-c* one or more messages, such as message 160*a*, regarding execution of a virtual appliance, such as virtual appliance 182*b*. Moreover, hardware providers 190*a-c* may respond with messages 160*b-d* with an indication of their cost. Controller 112 may select one of the hardware providers based on the received information from the hardware providers 190*a-c* (which in this case corresponds to cost). In some implementations, the hardware providers 190*a-c* also provide their capabilities to controller 112 to enable selection of one of the hardware providers 190*a-c*. In this case, the controller 112 may select a hardware provider to execute the virtual appliance based on cost as well as the capabilities of the hardware provider.

Network 150*a-f* may be any type of communications mechanism and may include, alone or in any suitable combination, intra-process communications, the Internet, an intranet, or any other communication mechanism (e.g., a telephony-based network, a local area network (LAN), a wide area network (WAN), a dedicated intranet, a wireless network, and a bus). Moreover, network 150*a-f* may be embodied using bidirectional, unidirectional, or dedicated communication links. Network 1501*a-f* may also support standard transmission protocols, such as Transmission Control Protocol/Internet Protocol (TCP/IP), Hyper Text Transfer Protocol (HTTP), SOAP, WS-RM, RPC, or other protocols.

Figure 2:
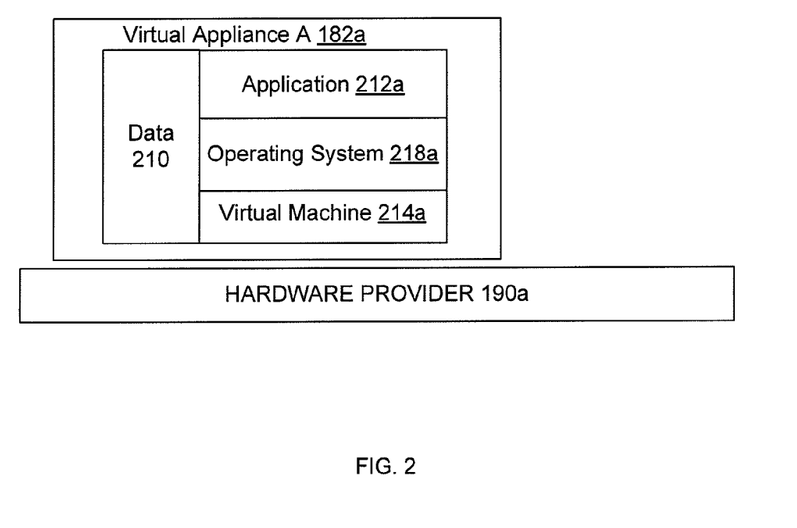
FIG. 2 depicts a block diagram of a virtual appliance.

FIG. 2 depicts an example of virtual appliance 182*a*. The virtual appliance 182*a* refers to a virtual machine 214*a* that includes an application 212*a*, an operating system 218*a*, and data 210 to enable configuration and/or operation of virtual machine 214. The virtual machine 214*a* may be implemented at a physical machine, such as one of the hardware providers 190*a-c*, capable of hosting one or more virtual appliances, such as virtual appliances 182*a-d*. Application 212*a* may correspond to any program, including a browser, word processing application, a customer relationship management (CRM) application, an enterprise resource planning (ERP) application, a product lifecycle management application, a supply chain management (SCM) application, a supplier relationship management application, as well as any other application. Operating system 218*a* may be implemented as any operating system, including Microsoft Windows, Microsoft Vista, Java, Sun OS, Linux, or any other operating system. A hypervisor may also be used to virtualizes the physical host provided by the hardware provider.

Figure 3:
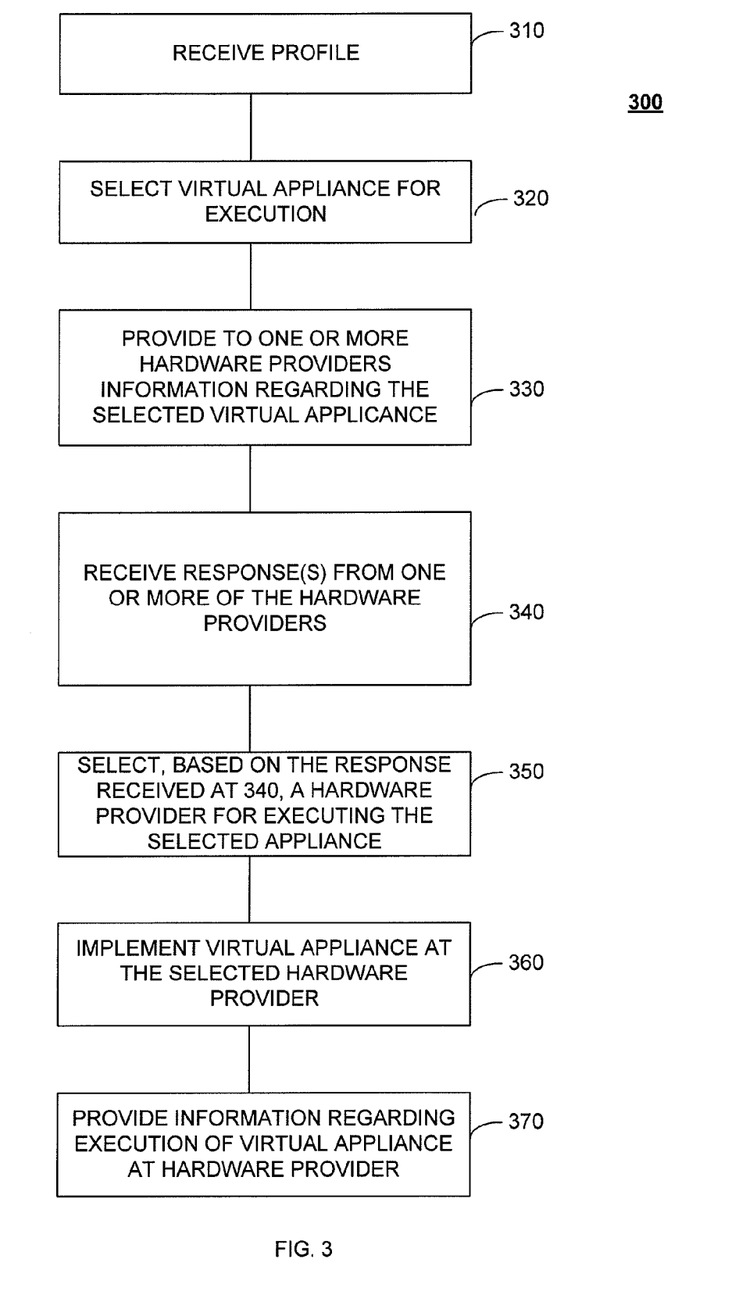
FIG. 3 depicts a process 300 for implementing a virtual machine at a hardware provider.

FIG. 3 depicts a process 300 for executing virtual appliances. At 310, controller 112 receives a local profile 110. The local profile 110 may include information regarding the execution of a virtual appliance. In some implementations, a user of user interface 107 may provide information indicating the location of the hardware providers 190*a-c*, which may be candidates for executing a virtual appliance. Moreover, local profile 110 may include whether controller 112 should search or query for hardware providers or whether a default hardware provider (or a list of so-called "trusted" providers") should be used to execute the virtual appliance.

In some implementations, controller 112 may send one or more messages (e.g., message 160a) to one or more hardware providers 190a-c. The message 160a may include information describing a virtual appliance and requesting that a hardware provider provide cost information and the capabilities of the hardware provider to enable controller 112 to select a hardware provider. For example, controller 112 may send a message 160a indicating that cost and capability information is requested in connection with executing a virtual appliance including an application, such as a CRM application. The message 160a may include information formatted in a standard format, such as extensible Markup Language (XML) and the like, describing the requirements (e.g., processing speed, memory capacity, storage capacity, and network bandwidth) of the virtual appliance. The message 160a may enable a hardware provider to respond by sending a message (e.g., messages 160b-d) including information, such as a cost to execute the virtual appliance at a hardware provider, the capabilities (e.g., processing speed, memory capacity, storage capacity, and network bandwidth) of a hardware provider, and a time when the virtual appliance may be executed at a hardware provider.

Moreover, local profile 112 may include information describing whether the virtual appliance should be executed immediately at the hardware provider or whether a user at user interface 107 should confirm whether execution of a virtual appliance at a hardware provider is allowed. This local profile information may be provided to controller 112 to enable it to control execution of the virtual appliance at the hardware provider.

At 320, to select a virtual appliance, user interface 107 provides an indication to select one or more virtual appliances. The indication may be in the form of a message from user interface 107 indicating that one or more virtual appliances 182a-d at server 180 have been selected. FIG. 1 depicts that virtual appliance 182a has been selected 109. The indication of which virtual appliance has been selected is provided to controller 112. In some implementations, a user at user interface 107 selects a virtual appliance by, for example, clicking on an icon or button associated with a virtual appliance (e.g., "Start virtual appliance A" 109.) When this selection occurs, the process 300 may be implemented as an automated process in which this selection (i.e., this one-click) 109 is the only interaction required by a user of user interface 107 except for establishment of a local profile 110, which may be done before the selection at 320.

In some implementations, to select a hardware provider, a search may be performed on an intranet, the Internet, or a combination of both. For example, a search program may be provided at computer 105 to enable a search of any available hardware providers capable of executing the virtual appliance (e.g., a search based on processing capacity, memory capacity, storage capacity, and/or network bandwidth). Alternatively, a user may be asked to enter one or more hostnames for the hardware providers, which are then queried to determine whether they have sufficient capacity. In some cases, a user may manually provide all the data that is normally stored in local profile 110. At 330, controller 112 provides one or more hardware providers 190a-c information regarding the selected virtual appliance. For example, controller 112 may send a message 160a to a hardware provider, such as one of the hardware providers 190a-c. The message 160a may include one or more of the following: a location (e.g., a Uniform Resource Locator, a Uniform M Resource Identifier, an IP address, a MAC address, and the like) of controller 112; a location of server 180; a location of virtual appliances; any requirements (e.g., processing speed, memory capacity, storage capacity, and network bandwidth) of the virtual appliances; any required capabilities (e.g., processing speed, memory capacity, storage capacity, and network bandwidth) of the hardware providers; an indication that a cost information is requested for executing the virtual appliance; and a time when a virtual appliance may be executed at the hardware provider. The message 160a may include information formatted in XML, although formats other than XML may be used as well. Although the above describes controller 112 providing information regarding the selected virtual appliance, in other implementations server 180 or user interface 107 may provide such information as well.

In some other implementations, message 160a provides the location of a virtual appliance, so that a hardware provider can then open that virtual appliance (and any associated files) and analyze relevant data associated with the virtual appliance. This analysis enables the hardware provider to determine the requirements of the virtual appliance and thus provide a response, such as messages 160b-d. Alternatively, message 160a may identify the location of a repository including relevant data describing the requirements of the virtual appliance. Alternatively, controller 112 may open the virtual appliance to analyze relevant data associated with the virtual appliance. The controller 112 then passes this information to the hardware provider.

At 340, controller 112 may receive responses from one or more hardware providers (e.g., hardware providers 190a-c). These responses may include information regarding the execution of the selected virtual appliance at a hardware provider. For example, the response may be in the form of a message, such as messages 160b-d, including information, such as a cost to execute a virtual appliance, the capabilities of a hardware provider, and the time when a virtual appliance may be executed.

At 350, controller 112 may select a hardware provider to execute the selected virtual appliance. Controller 112 may receive responses (e.g., messages 160b-d) from one or more hardware providers 190a-c. These responses as well as information in local profile 110 may be evaluated to determine a hardware provider. The determination may use a variety of criteria for selecting a hardware provider. For example, one or more of the following may be used as criteria: a cost to execute the virtual appliance (e.g., Dollars, Dollars per minute of execution, Euros, and the like); a time when the virtual appliance may be executed at a hardware provider; capabilities of a hardware provider (e.g., processing speed, memory capacity, storage capacity, network bandwidth, quantity of machines to be provided (e.g. a CRM running on one or more machines)); requirements of the virtual appliance; and any other criteria. Moreover, in some implementations, the criteria may be weighted. For example, cost may be weighted twice as much as other criteria.

In some implementations, the criteria may include one or more default hardware providers, which should be used in most cases unless the cost and capability of another hardware provider exceeds a threshold. For example, hardware provider 190a may be used as a default hardware provider, which would be selected at 350 unless another hardware provider can host an execution of a virtual appliance at a cost that is 20% lower than the cost of hardware provider 190a.

At 360, controller 112 may then implement the virtual appliance selected at 320 at the hardware provider selected at

350. To implement the virtual appliance at the selected hardware provider, controller 112 initiates a download to the selected hardware provider and then starts the selected virtual appliance at that hardware provider. To initiate the download, controller 112 may send a message (e.g., a HTTP request), so that server 180 downloads the selected virtual appliance to the hardware provider selected at 350, and then a start of the virtual appliance is initiated either by the controller 112 or by the server 180. Alternatively, the virtual appliance might be downloaded locally by the controller to computer 105 first, and then uploaded to the hardware provider (e.g., in the case of the HW provider not allowing connections from an untrusted or third party site.

At 370, the hardware provider selected at 350 may provide any metrics concerning the potential execution of the virtual appliance. These metrics may be provided to at least one of the controller 112 or user interface 107 for presentation. Alternatively, the hardware provider may send a message including the location of the hardware provider and virtual appliance (e.g., a URL or URI), so that user interface 107 may access the running virtual appliance.

Figure 4:
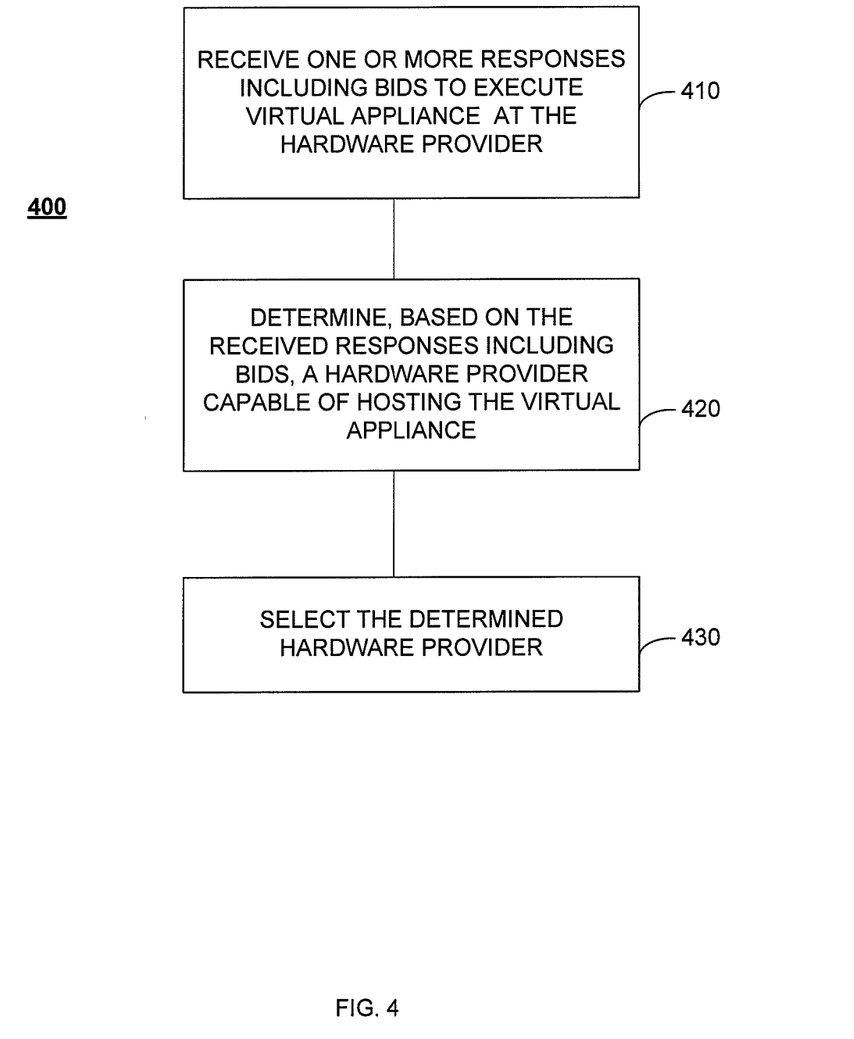
FIG. 4 depicts a process 300 for selecting a hardware provider based on a bid.

FIG. 4 depicts a process for evaluating responses implemented as bids, i.e., offers.

At 410, controller 112 may receive one or more messages 160*b-d*. The messages 160-*b-d* may include one or more bids including the cost to execute the virtual appliance. In some cases, the received bid may be received as part of an auction. An auction refers to selling the service provided by a hardware provider, which in this case is the lowest cost hardware provider capable of properly executing the virtual appliance. Moreover, in some cases, the hardware providers may submit multiple bids to become a winning bidder.

At 420, the controller 112 may determine, based on the responses received at 410, which of the hardware providers is best suited to execute the virtual appliance. For example, if all of the hardware providers have sufficient capabilities to execute the virtual appliance, controller 112 may determine that the hardware provider with the lowest bid is best suited to execute the virtual appliance. As such, at 430, controller 112 selects the hardware provider based on the results of 420 (e.g., controller 112 accepts a bid by sending a message to the winning hardware provider). Controller 112 may then proceed with 360-370 as described above with respect to FIG. 3.

In some implementations, the subject matter described herein provides an automated mechanism to run virtual appliances. A user may execute a virtual appliance without regard to knowledge about the virtual appliance (i.e., in terms of hardware requirements) or where to get the appropriate hardware. For example, a user may want to run Excel. When this is the case, the user clicks on the Excel virtual appliance. Controller 112 provides an indication to the user that a single hardware machine (e.g., with a slow processor, modest main memory, and low network bandwidth), and an indication of different hardware providers with offerings for that single hardware machine. Controller 112 typically provides an indication of associated costs to use the machines offered by the hardware provider. After a user accepts one of the hardware offerings, the user can run Excel at the machine at the selected hardware provider. In another case, a user wants to run a complex business suite, such the SAP Business Suite. The business suite may include, among other things, offerings such as a CRM, a SCM, an ERP, and a BI. Each of these offerings may require between 5 and 80 physical machines as the offering may include a Central Instance, many dialog instances, and a DB. In this case, the virtual appliance(s) would include many components (e.g. each dialog instance would be a virtual appliance). Moreover, controller 112 would provide an indication to a user that high-end hardware is required, that at least 50 machines are required, and that the cost is a greater than running Excel as in the previous example. After a user accepts the indication provided by controller 112, the user runs the full business suite at the selected hardware provider.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Moreover, although the subject matter described above was described with respect to virtual appliances, the virtual appliances may be implemented as virtual machines as well.

The foregoing description is intended to illustrate but not to limit the scope of the invention, which is defined by the scope of the appended claims. Other embodiments are within the scope of the following claims.

What is claimed:

1. A non-transitory computer-readable storage medium containing instructions to configure at least one processor to perform a method, the method comprising:

receiving a local profile including information representative of at least location information for one or more hardware providers;

selecting, at a user interface, at least one of a plurality of virtual appliances;

providing information to the one or more hardware providers, the provided information representing the selected at least one of the plurality of virtual appliances, the one or more hardware providers including one or more hardware processors for hosting the selected at least one of the plurality of virtual appliances;

receiving, from the one or more hardware providers, information representative of at least whether the one or more hardware processors are capable of executing the selected at least one of the plurality of virtual appliances, the received information including a plurality of criteria for selecting the one or more hardware providers, the plurality of criteria including one or more costs to execute the selected at least one of the plurality of virtual appliances at the one or more hardware processors, at least one capability of the one or more hardware processors, and a time when the one or more hardware processors are available for execution by the selected at least one of the plurality of virtual appliances, wherein the plurality of criteria is weighted and further includes one or more default hardware providers;

selecting, based on the received information, at least one of the one or more hardware providers including the corresponding one or more hardware processors associated therewith, when a cost and a capability of at least one of the one or more hardware providers is equal to or greater than a threshold;

selecting at least one of the one or more default hardware providers, when the cost and the capability of the at least one of the one or more hardware providers is less than the threshold; and implementing, the selected at least one of the plurality of virtual appliances, at the selected at least one of the one or more hardware providers or the one or more default hardware providers including the corresponding one or more hardware processors associated therewith.

2. The non-transitory computer-readable medium of claim 1 further comprising:
receiving, from the one or more hardware providers, one or more messages including one or more bids offering to execute the selected at least one of the plurality of virtual appliances.

3. The non-transitory computer-readable medium of claim 1 further comprising:
providing, to a controller, information representing a result of executing the selected at least one of the plurality of virtual appliances.

4. A method comprising:
receiving a local profile including information representative of at least location information for one or more hardware providers;
selecting, at a user interface, at least one of a plurality of virtual appliances;
providing information to the one or more hardware providers, the provided information representing the selected at least one of the plurality of virtual appliances, the one or more hardware providers including one or more hardware processors for hosting the selected at least one of the plurality of virtual appliances;
receiving, from the one or more hardware providers, information representative of at least whether the one or more hardware processors are capable of executing the selected at least one of the plurality of virtual appliances, the received information including a plurality of criteria for selecting the one or more hardware providers, the plurality of criteria including one or more costs to execute the selected at least one of the plurality of virtual appliances at the one or more hardware processors, at least one capability of the one or more hardware processors, and a time when the one or more hardware processors are available for execution by the selected at least one of the plurality of virtual appliances, wherein the plurality of criteria is weighted and further includes one or more default hardware providers;
selecting, based on the received information, at least one of the one or more hardware providers including the corresponding one or more hardware processors associated therewith, when a cost and a capability of at least one of the one or more hardware providers is equal to or greater than a threshold;

selecting at least one of the one or more default hardware providers, when the cost and the capability of the at least one of the one or more hardware providers is less than the threshold: and implementing, the selected at least one of the plurality of virtual appliances, at the selected at least one of the one or more hardware providers or the one or more default hardware providers including the corresponding one or more hardware processors associated therewith.

5. The method of claim 4 further comprising:
receiving, from the one or more hardware providers, one or more messages including one or more bids offering to execute the selected at least one of the plurality of virtual appliances.

6. The method of claim 4 further comprising:
providing, to a controller, information representing a result of executing the selected at least one of the plurality of virtual appliances.

7. A system comprising:
at least one processor; and
at least one memory, wherein the at least one processor and the at least one memory are configured to perform operations comprising:
receiving a local profile including information representative of at least location information for one or more hardware providers;
selecting, at a user interface, at least one of a plurality of virtual appliances;
providing information to the one or more hardware providers, the provided information representing the selected at least one of the plurality of virtual appliances, the one or more hardware providers including one or more hardware processors for hosting the selected at least one of the plurality of virtual appliances;
receiving, from the one or more hardware providers, information representative of at least whether the one or more hardware processors are capable of executing the selected at least one of the plurality of virtual appliances, the received information including a plurality of criteria for selecting the one or more hardware providers, the plurality of criteria including one or more costs to execute the selected at least one of the plurality of virtual appliances at the one or more hardware processors, at least one capability of the one or more hardware processors, and a time when the one or more hardware processors are available for execution by the selected at least one of the plurality of virtual appliances, wherein the plurality of criteria is weighted and further includes one or more default hardware providers;
selecting, based on the received information, at least one of the one or more hardware providers including the corresponding one or more hardware processors associated therewith, when a cost and a capability of at least one of the one or more hardware providers is equal to or greater than a threshold;
selecting at least one of the one or more default hardware providers, when the cost and the capability of the at least one of the one or more hardware providers is less than the threshold; and
implementing, the selected at least one of the plurality of virtual appliances, at the selected at least one of the one or more hardware providers or the one or more default hardware providers including the corresponding one or more hardware processors associated therewith.

8. The system of claim 7 further comprising:
receiving, from the one or more hardware providers, one or more messages including one or more bids offering to execute the selected at least one of the plurality of virtual appliances.

9. The system of claim 7 further comprising:
providing, to a controller, information representing a result of executing the selected at least one of the plurality of virtual appliances.

10. The system of claim 7, wherein the information representative of whether the one or more processors are capable of executing the at least one of the plurality selected of virtual appliances comprises one or more of a processing speed, a memory capacity, a storage capacity, and a network bandwidth.

11. The method of claim 4, wherein the information representative of whether the one or more processors are capable of executing the selected at least one of the plurality of virtual appliances comprises one or more of a processing speed, a memory capacity, a storage capacity, and a network bandwidth.

12. The non-transitory computer-readable medium of claim 1, wherein the information representative of whether the one or more processors are capable of executing the selected at least one of the plurality of virtual appliances comprises one or more of a processing speed, a memory capacity, a storage capacity, and a network bandwidth.

* * * * *